US011465234B2

(12) United States Patent
Ding et al.

(10) Patent No.: US 11,465,234 B2
(45) Date of Patent: Oct. 11, 2022

(54) LASER SOLDERING DEVICE AND LASER SOLDERING METHOD

(71) Applicant: Delta Electronics, Inc., Taoyuan (TW)

(72) Inventors: Ren-Feng Ding, Taoyuan (TW); Hung-Wen Chen, Taoyuan (TW); Shu-Han Wu, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 11 days.

(21) Appl. No.: 17/028,088

(22) Filed: Sep. 22, 2020

(65) Prior Publication Data

US 2022/0009029 A1     Jan. 13, 2022

(30) Foreign Application Priority Data

Jul. 13, 2020   (CN) .......................... 202010669355.5

(51) Int. Cl.
  *B23K 26/20*     (2014.01)
  *B23K 26/352*    (2014.01)
  (Continued)

(52) U.S. Cl.
  CPC ........ *B23K 26/0626* (2013.01); *B23K 1/0056* (2013.01); *B23K 26/034* (2013.01); *B23K 26/0648* (2013.01); *B23K 2101/42* (2018.08)

(58) Field of Classification Search
  CPC .............. B23K 26/20–21; B23K 26/32; B23K 26/352–354; B23K 1/005–0056; B23K 31/02–025; B23K 33/00–008
  See application file for complete search history.

(56) References Cited

U.S. PATENT DOCUMENTS

| 6,289,028 B1* | 9/2001 | Munks ............... G02B 5/20 372/20 |
| 2017/0157707 A1* | 6/2017 | Landon .............. B23K 26/046 |
| 2020/0055132 A1* | 2/2020 | Ding .................. B23K 26/20 |

FOREIGN PATENT DOCUMENTS

| CN | 101774090 A | 7/2010 |
| CN | 107957080 A | 4/2018 |

OTHER PUBLICATIONS

A Novel Thermodynamic Model and Temperature Control Method of Laser Soldering Systems, Zhihua Chen et al. (Year: 2015).*

(Continued)

*Primary Examiner* — Michael A Laflame, Jr.
(74) *Attorney, Agent, or Firm* — Muncy, Geissler, Olds & Lowe, P.C.

(57) ABSTRACT

A laser soldering device includes a laser source, a lens group, a temperature sensor, and a feedback controller. The laser source emits a laser beam, which is power-adjustable, according to a control signal. The temperature sensor receives infrared rays radiated when the laser beam is irradiated to the soldering point to detect the temperature of the soldering point, and correspondingly outputs a sensing signal according to the detected temperature. When the detected temperature falls into a first temperature range based on a target temperature, the feedback controller executes a PID algorithm to calculate a predicted error value according to an error value between the detected temperature and the target temperature. The feedback controller controls the laser source according to the predicted error value, and adjusts the power of the laser beam accordingly, so that the detected temperature can be substantially equal to the target temperature.

9 Claims, 4 Drawing Sheets

(51) Int. Cl.
*B23K 26/32* (2014.01)
*B23K 26/06* (2014.01)
*B23K 1/005* (2006.01)
*B23K 26/03* (2006.01)
*B23K 101/42* (2006.01)

(56) References Cited

OTHER PUBLICATIONS

Qualification of a system technology for selective laser-based quasi-simultaneous soldering with an integrated pyrometric process control, Jakob Ermer et al. (Year: 2020).*
TW Office Action and Search Report of corresponding TW application No. 109123503 dated Feb. 3, 2021, 11 pages.

* cited by examiner

LASER SOLDERING DEVICE AND LASER SOLDERING METHOD

CROSS REFERENCE TO RELATED APPLICATIONS

This application claims priority to and the benefit of China Application No. 202010669355.5, filed on Jul. 13, 2020, the entirety of which is incorporated by reference herein.

FIELD OF THE INVENTION

The invention relates to a laser soldering device and a laser soldering method, especially one relating to a laser soldering device and a laser soldering method that simultaneously use a power mode and a temperature feedback mode.

DESCRIPTION OF THE RELATED ART

The laser soldering process includes a power mode and a temperature feedback mode. In the power mode, the output power of the laser beam is set according to the characteristics of soldering points. However, because the energy of the laser beam continues to accumulate, the soldering temperature can easily become too high, causing damage to the components or the PCB. On the other hand, due to the different quality of the components supplied, and the different oxidation levels of the component pins or PCB pad surfaces, the components have different absorption rates for the laser beam, resulting in insufficient energy accumulation, lower heating temperature of the soldering point, and the problem of cold soldering or un-melted tin wire.

In the heating process of the temperature feedback mode, the temperature sensor receives the infrared signal generated by the heating soldering point, and feeds the temperature signal during the heating process back to the feedback controller. The feedback controller sets a target temperature curve to adjust the output power of the laser source, and then reaches the melting point temperature of the solder, so that the component is bonded to the PCB through the solder. The temperature feedback mode improves the quality and stability of soldering process. However, if the laser beam excites abnormal light, the temperature sensor receives the abnormal signal, resulting in incorrect sensing signals for temperature feedback, and soldering errors may still happen.

BRIEF SUMMARY OF THE INVENTION

In order to resolve the issues described above, an embodiment of the invention provides a laser soldering device. The laser soldering device includes a laser source, a lens group, a temperature sensor, and a feedback controller. The laser source emits a laser beam, which is power-adjustable, according to a control signal. The lens group outputs the laser beam to a soldering point. The temperature sensor receives infrared rays radiated when the laser beam is irradiated to the soldering point to detect the temperature of the soldering point, and correspondingly outputs a sensing signal according to the detected temperature. The feedback controller receives the sensing signal, and sends a control signal to the laser source according to the sensing signal. When the detected temperature falls into a first temperature range based on a target temperature, the feedback controller executes a proportional-integral-differential (PID) algorithm to calculate a predicted error value according to an error value between the detected temperature and the target temperature. The feedback controller controls the laser source according to the predicted error value, and adjusts the power of the laser beam accordingly, so that the detected temperature can be substantially equal to the target temperature. When the detected temperature falls outside the first temperature range, the feedback controller controls the laser source according to a preset power, so that the laser source emits the laser beam that meets the preset power.

According to the laser soldering device disclosed above, the laser source includes a power meter. The power meter detects the power of the laser beam, and correspondingly outputs a power feedback signal to the feedback controller according to the detected power, so that the feedback controller can adjust the power of the laser beam transmitted from the laser source through the control signal according to the power feedback signal.

According to the laser soldering device disclosed above, the feedback controller executes the PID algorithm to generate a proportional calculation unit, an integral calculation unit, and a derivative calculation unit. The proportional calculation unit multiplies the error value between the currently detected temperature and the target temperature by a first gain to obtain a proportional result. The integral calculation unit sums the error value at each time point in the past to obtain a total error, and multiplies the total error by a second gain to obtain an integral result. The derivative calculation unit performs a first-order differentiation on the current error value to obtain a future error value for predicting the future change of the error value, and multiplies the future error value by a third gain to obtain a derivative result.

According to the laser soldering device disclosed above, the feedback controller sums the proportional result, the integral result, and the derivative result to obtain the predicted error value.

According to the laser soldering device disclosed above, when the detected temperature falls into the first temperature range based on the target temperature, and also falls into a second temperature range based on the target temperature, the feedback controller sets the first gain, the second gain, and the third gain to a first value group. The first temperature range comprises the second temperate range.

According to the laser soldering device disclosed above, when the detected temperature falls into the first temperature range based on the target temperature, but the detected temperature does not fall into the second temperature based on the target temperature, the feedback controller sets the first gain, the second gain, and the third gain to a second value group. The second value group is not completely the same and not completely different from the first value group.

An embodiment of the invention provides a laser soldering method. The laser soldering method includes emitting a laser beam, which is power-adjustable, to a soldering point according to a control signal; receiving infrared rays radiated when the laser beam is irradiated to the soldering point to detect the temperature of the soldering point; outputting a sensing signal according to the detected temperature correspondingly; receiving the sensing signal to obtain the detected temperature; when the detected temperature falls into a first temperature range based on a target temperature, executing a PID algorithm to calculate a predicted error value according to an error value between the detected temperature and the target temperature; controlling the laser source according to the predicted error value; and adjusting the power of the laser beam accordingly, so that the detected temperature can be substantially equal to the target temperature; when the detected temperature falls outside the first temperature range, adjusting the power of the laser beam according to a preset power.

According to the laser soldering method disclosed above, executing the PID algorithm includes multiplying the error value between the currently detected temperature and the target temperature by a first gain to obtain a proportional result; summing the error value at each time point in the past to obtain a total error, and multiplying the total error by a second gain to obtain an integral result; and performing a first-order differentiation on the current error value to obtain a future error value for predicting the future change of the error value, and multiplying the future error value by a third gain to obtain a derivative result.

According to the laser soldering method disclosed above, executing the PID algorithm further includes summing the proportional result, the integral result, and the derivative result to obtain the predicted error value.

According to the laser soldering method disclosed above, further including when the detected temperature falls into the first temperature range based on the target temperature, and also falls into a second temperature range based on the target temperature, setting the first gain, the second gain, and the third gain to a first value group. The first temperature range comprises the second temperate range.

According to the laser soldering method disclosed above, further including when the detected temperature falls into the first temperature range based on the target temperature, but the detected temperature does not fall into the second temperature based on the target temperature, setting the first gain, the second gain, and the third gain to a second value group. The second value group is not completely the same and not completely different from the first value group.

BRIEF DESCRIPTION OF THE DRAWINGS

The invention can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration.

DETAILED DESCRIPTION OF THE INVENTION

Figure 1:
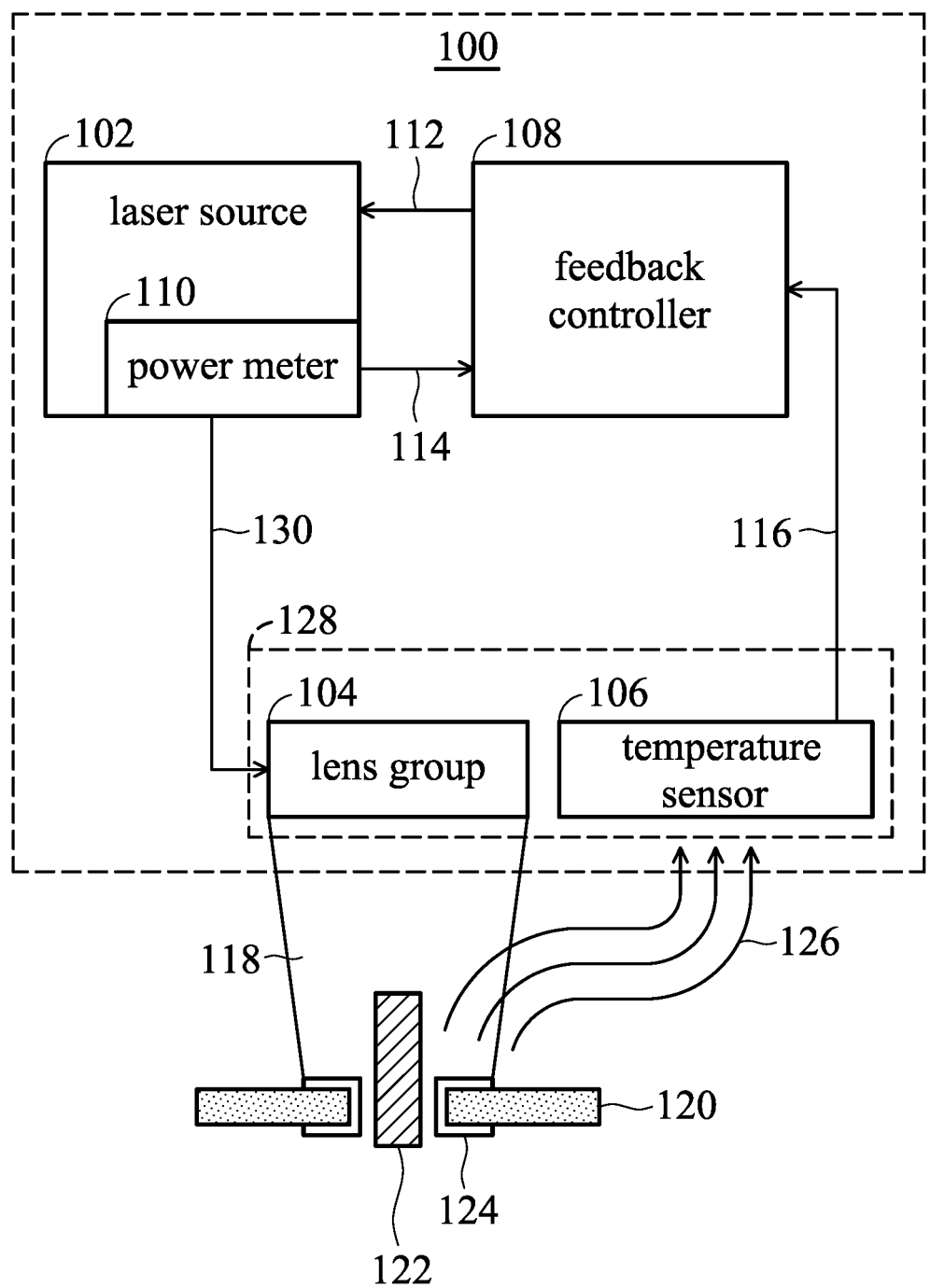
FIG. 1 is a schematic diagram of a laser soldering device and the operation environment thereof in accordance with some embodiments of the disclosure.

FIG. 1 is a schematic diagram of a laser soldering device 100 and the operation environment thereof in accordance with some embodiments of the disclosure. As shown in FIG. 1 the laser soldering device 100 includes a laser source 102, a lens group 104, a temperature sensor 106, and a feedback controller 108. The laser source 102 emits a laser beam 118, which is power-adjustable, according to a control signal 112 from the feedback controller 108. In some embodiments, the laser source 102 may be a laser generator including a laser diode (not shown), or other types of laser generators. In some embodiments, the laser source 102 further includes a power meter 110. The power meter 110 detects the power of the laser beam 118, and correspondingly outputs a power feedback signal 114 to the feedback controller 108 according to the detected power of the laser beam 118 so that the feedback controller 108 can adjust the power of the laser beam 118 transmitted from the laser source 102 through the control signal 112 according to the power feedback signal 114.

The laser beam 118 emitted by the laser source 102 is transmitted to the lens group 104 through an optical fiber 130. The lens group 104 outputs the laser beam 118 to a pad and a component pin 122 on a PCB 120 for soldering the component pin 122 and a pad 124 together, so that the component pin 122 can be fixed on the PCB 120. In some embodiments, the lens group 104 can be a convex lens group or a combined lens group with both convex lens and concave lens for projecting the laser beam 118 onto the component pins 122 and the pads 124. In some embodiments, the laser source 102 can be replaced by X-ray, ultraviolet light, megahertz wave, microwave, and other electromagnetic wave generators, and the present invention is not limited thereto. In some embodiments, the laser beam 118 is not limited to a focused beam, and may also be a parallel beam.

When the laser beam 118 irradiates the component pin 122 and the pad 124, due to the high energy characteristics of the laser beam 118, the temperature of the component pin 122 and the pad 124 continue to rise over time. When the temperature of the component pin 122 and the pad 124 is higher than the melting point temperature of the solder (such as tin wires, not shown), the solder will melt into a liquid state and penetrate into a through hole between the component pin 122 and the pad 124. After the temperature is lowered, the solder solidifies again into a solid state, so that the component pins 122 and the pads 124 can be electrically connected. In some embodiments, in the process of continuously increasing the temperature to a target temperature, the surface of the component pin 122, the pad 124, and the PCB 120 (commonly referred to as a soldering point) will radiate infrared rays 126, which are detected by the temperature sensor 106.

The temperature sensor 106 receives the infrared rays 126 when the laser beam 118 is irradiated to the component pin 122 and the pad 124, and detects the temperature of the component pin 122 and the pad 124 according to the intensity of the received infrared rays 126, and correspondingly outputs a sensing signal 116 to the feedback controller 108 according to the detected temperature. Generally, the higher the temperature of the component pin 122, the pad 124, and the PCB 120, the greater the intensity of the infrared rays 126 radiated by them. The greater the intensity of the infrared rays 126 received by the temperature sensor 106, the higher the temperature of the component pin 122, the pad 124, and the PCB 120 measured by the temperature sensor 106. Then, the temperature sensor 106 sends the sensing signal to the feedback controller 108 according to the detected temperature of the soldering point.

In some embodiments, the sensing signal 116 may carry temperature information including a plurality of bits, or is called temperature raw data. The temperature sensor 106 converts the detected temperature of the soldering point into digital temperature raw data. The temperature raw data is carried by the sensing signal 116, and finally is sent to the feedback controller 108. In some embodiments, the temperature sensor 106 can be a pyroelectric infrared (PIR)

sensor, a thermopile temperature sensor, or other types of temperature sensors. In some embodiments, the lens group 104 and the temperature sensor 106 are arranged in a laser soldering sub-device 128, but the present invention is not limited thereto. In some embodiments, the lens group 104 and the temperature sensor 106 can be separately arranged in the laser soldering device 100. In some embodiments, the temperature sensor 106 is not limited to a non-contact sensor, but can also be a contact temperature measuring instrument or an equivalent temperature sensor. In some embodiments, the target measured by the temperature sensor 106 is not limited to infrared light, but can also be far-infrared light, color temperature, color temperature, etc., which can measure the equivalent temperature.

The feedback controller 108 receives the sensing signal 116 from the temperature sensor 106. In some embodiments, the feedback controller 108 extracts the temperature information of the detected soldering point from the received sensing signal 116, and compares the detected temperature with a target temperature at the current time point. The control signal 112 is then correspondingly transmitted to the laser source 102 according to an error value between the detected temperature and the target temperature.

Figure 2:
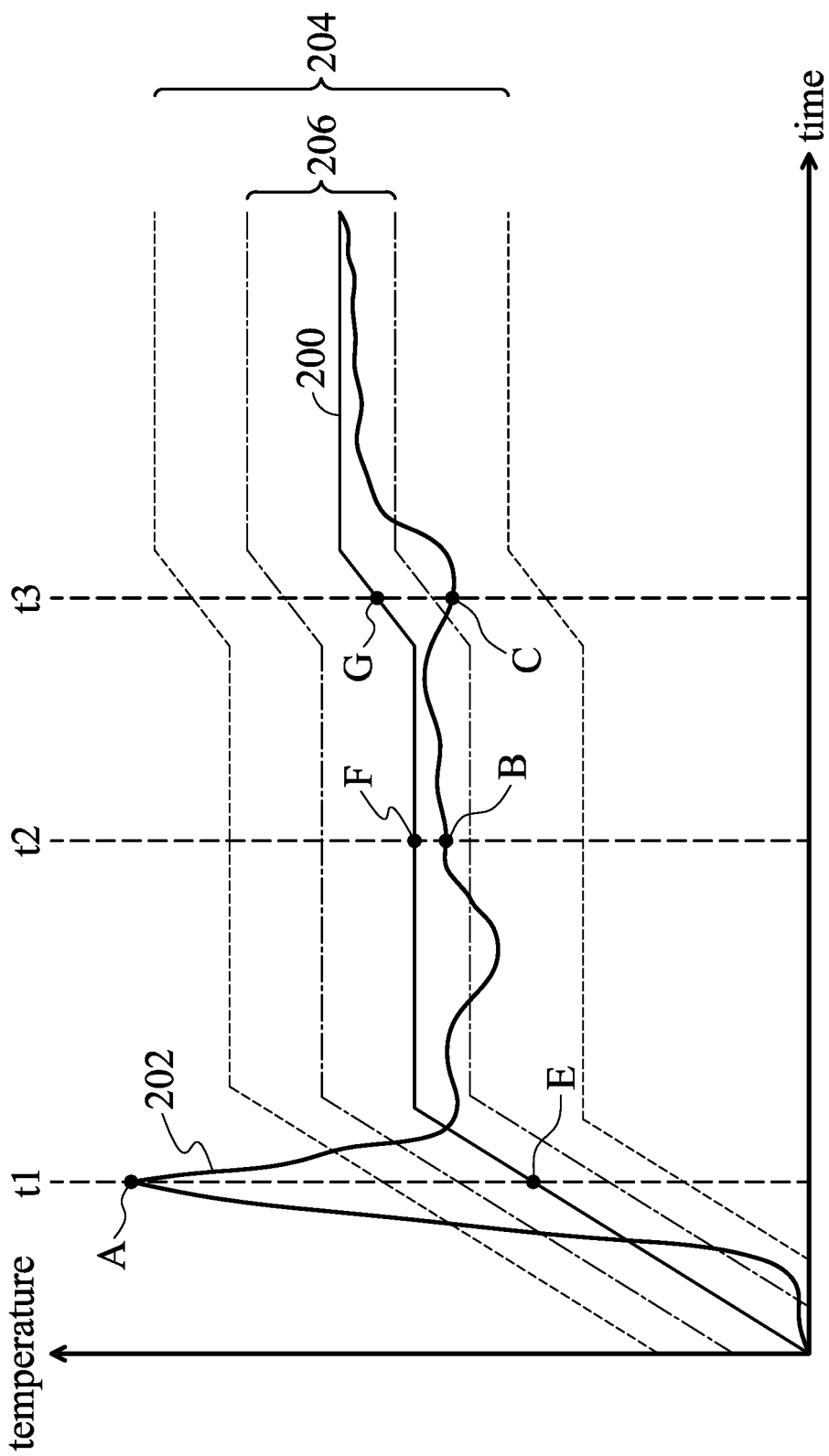
FIG. 2 is a relationship chart between temperatures detected by a temperature sensor of the laser soldering device in FIG. 1 and target temperatures in accordance with some embodiments of the disclosure.

FIG. 2 is a relationship chart between temperatures detected by a temperature sensor 106 of the laser soldering device 100 in FIG. 1 and target temperatures in accordance with some embodiments of the disclosure. As shown in FIG. 2, the feedback controller in FIG. 1 can set different target temperatures at different time points to form a target temperature curve 200 in FIG. 2. The feedback controller 108 reads the detected temperature information in the sensing signal 116 sent by the temperature sensor 106 at different time points to form a detected temperature curve 202 in FIG. 2. In some embodiments, the production line operators set the target temperature curve 200 through a user interface (UI) (not shown) of the laser soldering device 100, so that the feedback controller 108 is enabled to perform corresponding operations at different time points according to the error value between the detected temperature and the target temperature.

In some embodiments, according to welding requirements and the past welding experience, the feedback controller 108 can set a temperature range 204 and a temperature range 206 that vary based on the target temperature curve 200. When the detected temperature falls into the temperature range 204 based on the target temperature curve 200, that is, the absolute value of the error value between the detected temperature and the target temperature is less than or equal to a first threshold, the feedback controller 108 executes a PID algorithm to calculate a predicted error value according to the error value between the detected temperature and the target temperature. The feedback controller 108 controls the laser source 102 through the control signal 112 according to the predicted error value, and adjusts the power of the laser beam 118 accordingly, so that the detected temperature can be substantially equal to the target temperature. When the detected temperature falls outside the temperature range 204, that is, the absolute value of the error value between the detected temperature and the target temperature is greater than the first threshold value, the feedback controller 108 controls the laser source 102 through the control signal 112 according to a preset power, so that the laser source 102 emits a laser beam 118 that meets the preset power.

For example, as shown in FIG. 2, at time point t1, the tamet temperature is the temperature value at point E on the target temperature curve 200, and the detected temperature is the temperature value at point A on the detected temperature curve 202. Since the detected temperature falls outside the temperature range 204 at time point t1, in other words, the absolute value of the error value between the detected temperature and the target temperature is greater than the first threshold, the feedback controller 108 of the laser soldering device 100 in FIG. 1 controls the laser source 102 through the control signal 112 according to the preset power, so that the laser source 102 emits a laser beam 118 that meets the preset power. In some embodiments, the preset power at different time points can be different or the same value. In some embodiments, the preset power is the setting value obtained from the past welding experience. By adjusting the transmission power of the laser beam 118 to the preset power, the error value between the detected temperature of the temperature sensor 106 and the target temperature can be quickly converged.

At time point t2, the target temperature is the temperature value at point F on the target temperature curve 200, and the detected temperature is the temperature value at point B on the detected temperature curve 202. Since the detected temperature falls into the temperature range 204 at time point t2, in other words, the absolute value of the error value between the detected temperature and the target temperature is less than or equal to the first threshold, the feedback controller 108 executes a PID algorithm to calculate a predicted error value according to the error value between the detected temperature and the target temperature. The feedback controller 108 then indirectly adjusts the power of the laser beam 118 according to the predicted error value, so that the detected temperature of the soldering point detect by the temperature sensor 106 can approach the target temperature.

Similarly, at time point t3, the target temperature is the temperature value at point G on the target temperature curve 200, and the detected temperature is the temperature value at point C on the detected temperature curve 202. Since the detected temperature falls into the temperature range 204 at time point t3, in other words, the absolute value of the error value between the detected temperature and the target temperature is less than or equal to the first threshold, the feedback controller 108 executes the PID algorithm to calculate the predicted error value according to the error value between the detected temperature and the target temperature. After that, the feedback controller 108 indirectly adjusts the power of the laser beam 118 according to the predicted error value, so that the detected temperature of the soldering point detect by the temperature sensor 106 can approach the target temperature.

In some embodiments, the feedback controller 108 executes the PID algorithm to generate a proportional calculation unit (P), an integral calculation unit (I), and a derivative calculation unit (D). The proportional calculation unit (P) has a proportional gain ($K_p$). The integral calculation unit (I) has an integral gain ($K_i$). The derivative calculation unit (D) has a derivative gain ($K_d$). The proportional gain ($K_p$), the integral gain ($K_i$), and the derivative gain ($K_d$) are used to adjust the gain value occupied by the proportional calculation unit (P), the integral calculation unit (I), and the derivative calculation unit (D) in the entire PID algorithm. The feedback controller 108 can set the proportional gain ($K_p$), the integral gain ($K_i$), and the derivative gain ($K_d$) correspondingly according to the error value between the detected temperature and the target temperature, so that the detected temperature can be substantially equal to the target temperature.

For example, at time point t2, the detected temperature (point B on the detected temperature curve 202) not only falls into the temperature range 204. but also falls into the temperature range 206. In other words, the absolute value of the error value between the detected temperature and the target temperature is less than or equal to a second threshold. The second threshold is less than the first threshold. At this time, the feedback controller 108 sets the proportional gain ($K_p$) in the PID algorithm to P2, sets the integral gain ($K_i$) to I2, and sets the derivative gain ($K_d$) to D2 to get a gain setting group (P2, I2, D2).

At time point t3, the detected temperature (point C on the detected temperature curve 202) falls into the temperature range 204, but falls outside the temperature range 206. In other words, the absolute value of the error value between the detected temperature and the target temperature is greater than the second threshold, but less than the first threshold. At this time, the feedback controller 108 sets the proportional gain ($K_p$) in the PID algorithm to P1, sets the integral gain ($K_i$) to I1, and sets the derivative gain ($K_d$) to D1 to get a gain setting group (P1, I1, D1).

Figure 3:
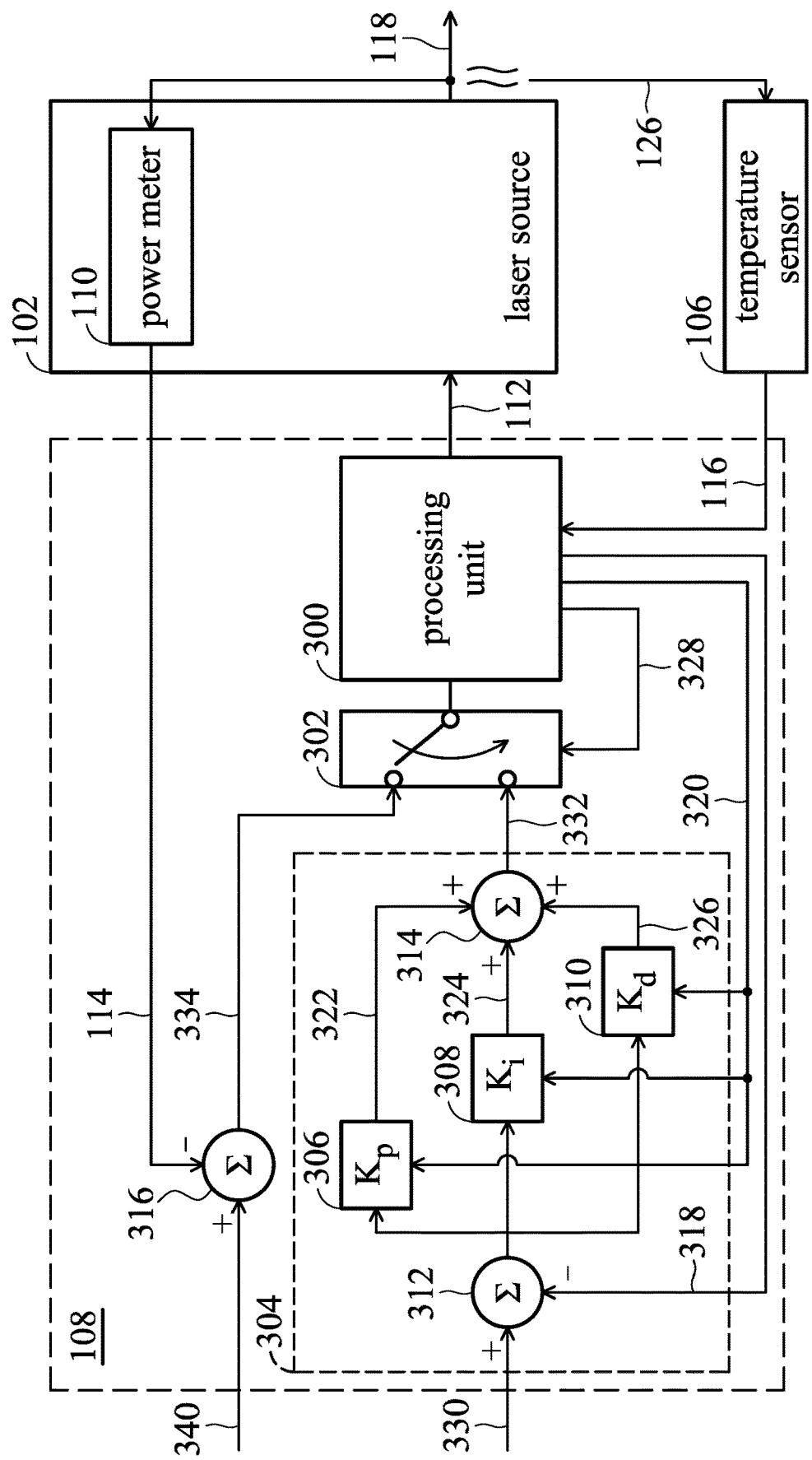
FIG. 3 is a schematic diagram of operations of a feedback controller of the laser soldering device in FIG. 1 in accordance with some embodiments of the disclosure.

FIG. 3 is a schematic diagram of operations of a feedback controller 108 of the laser soldering device 100 in FIG. 1 in accordance with some embodiments of the disclosure. As shown in FIG. 3, the feedback controller 108 includes a multiplexer 302, a PID calculation module 304, and a subtractor 316. The PID calculation module 304 is generated by the feedback controller 108 executing a PID algorithm. The PID calculation module 304 includes a proportional calculation unit 306, an integral calculation unit 308, a derivative calculation unit 310, a subtractor 312, and an adder 314. In some embodiments, a processing unit 300 of the feedback controller 108 receives the sensing signal 116 from the temperature sensor 106, and captures the information of the detected temperature 318 carried in the sensing signal 116. Then, the processing unit 300 sends the detected temperature 318 to the subtractor 312 in the PID calculation module 304. The subtractor 312 subtracts the target temperature 330 by the detected temperature 318 to obtain the error value between the target temperature 330 and the detected temperature 318.

The proportional calculation unit 306 multiplies the error value between the current detected temperature 318 and the target temperature 330 by the proportional gain ($K_p$) to obtain a proportional result 322. In some embodiments, when the proportional gain ($K_p$) is larger, the larger proportional result is obtained under the same error value. However, if the proportional gain ($K_p$) is too large, the output of the PID calculation module 304 will be unstable. On the contrary, if the proportional gain ($K_p$) is too small, a smaller proportional result 322 is obtained, so that the PID calculation module 304 is less sensitive to the error value between the detected temperature 318 and the target temperature 330. Therefore, when there is interference, the PID calculation module 304 cannot correct the interference.

The integral calculation unit 308 sums the error value between the detected temperature 318 and the target temperature 330 at each time point in the past to obtain a total error, and multiplies the total error by the integral gain ($K_i$) to obtain an integral result 324. In some embodiments, the integral calculation unit 308 can accelerate the process of the detected temperature 318 approaching the target temperature 330. The larger the integral gain ($K_i$), the faster the detected temperature 318 approaches the target temperature 330. The derivative calculation unit 310 performs a first-order differentiation on the current error value between the detected temperature 318 and the target temperature 330 to obtain an instantaneous error variation, and then obtains a future error value for predicting the future change of the error value, and multiplies the future error value by the derivative gain ($K_d$) to obtain a derivative result 326. In some embodiments, the derivative calculation unit 310 can increase the time for maintaining the error value between the detected temperature 318 and the target temperature 330 in a specific temperature range (for example, the temperature range 206 in FIG. 2). Finally, the adder 314 of the PID calculation module 304 sums the proportional result 322, the integral result 324, and the derivative result 326 to obtain a predicted error value 332. Simply put, the PID calculation module 304 is used to accelerate the minimization of the absolute value of the error value between the detected temperature 318 and the target temperature 330, so that the detected temperature 318 can quickly approach or be substantially equal to the target temperature 330.

Refer to FIG. 2 and FIG. 3 at the same time, when the detected temperature 318 falls into the temperature range 204 in FIG. 2 (for example, the temperature corresponding to points B and C on the detected temperature curve 202 in FIG. 2), that is, the absolute value of the error value between the detected temperature 318 and the target temperature 330 is less than or equal to the first threshold, the processing unit 300 outputs a control signal 328 to the multiplexer 302, so that the multiplexer 302 receives the predicted error value 332 from the PID calculation module 304. The processing unit 300 receives the predicted error value 332 through the multiplexer 302, and correspondingly controls the laser source 102 through the control signal 112 according to the magnitude of the predicted error value 332, so that the laser source 102 adjusts the transmission power of the laser beam 118, and the detect temperature 318 of the temperature sensor 106 can be substantially equal to or close to the target temperature 330.

In some embodiments, when the detected temperature 318 falls into the temperature range 204 in FIG. 2, and also falls into the temperature range 206 (for example, point B on the detected temperature curve 202 in FIG. 2), that is, the absolute value of the error value between the detected temperature 318 and the target temperature 330 is less than or equal to the second threshold, the processing unit 300 sets the proportional gain ($K_p$) of the proportional calculation unit 306 to P2 through a setting signal 320, sets the integral gain ($K_i$) of the integral calculation unit 308 to I2, and sets the derivative gain ($K_d$) of the derivative calculation unit 310 to D2, so that the detected temperature 318 and the target temperature 330 can be maintained within a specific temperature range (for example, the temperature range 206 in FIG. 2).

In some embodiments, when the detected temperature 318 falls into the temperature range 204 in FIG. 2, but falls outside the temperature range 206 (for example, point C on the detected temperature curve 202 in FIG. 2), that is, the absolute value of the error value between the detected temperature 318 and the target temperature 330 is less than or equal to the first threshold, but is greater than the second threshold, the processing unit 300 sets the proportional gain ($K_p$) of the proportional calculation unit 306 to P1 through a setting signal 320, sets the integral gain ($K_i$) of the integral calculation unit 308 to I1, and sets the derivative gain ($K_d$) of the derivative calculation unit 310 to D1, so that the detected temperature 318 is accelerated to approach the target temperature 330.

In some embodiments, the subtractor 316 in the feedback controller 108 subtracts a preset power 340 by the measured power carried in the power feedback signal 114 to obtain a power error 334. Refer to FIG. 2 and FIG. 3 at the same time, when the detected temperature 318 falls outside the temperature range 204 in FIG. 2 (for example, point A on the detected temperature curve 202 in FIG. 2), that is, the absolute value of the error value between the detected temperature 318 and the target temperature 330 is greater than the first threshold, the processing unit 300 outputs the control signal 328 to the multiplexer 302, so that the multiplexer 302 receives the power error 334 from the subtractor 316. The processing unit 300 receives the power error 334 through the multiplexer 302, and correspondingly outputs the control signal 112 to the laser source 102 according to the magnitude of the power error, so that laser source 102 adjusts the power of the laser beam 118, and the power of the laser beam 118 detected by the power meter 110 can be close to or substantially equal to the preset power 340, so as to reduce the error value between the detected temperature 318 and the target temperature 330.

In some embodiments, when the detected temperature 318 falls outside the temperature range 204 in FIG. 2 (for example, point A on the detected temperature curve 202 in FIG. 2), that is, the absolute value of the error value between the detected temperature 318 and the target temperature 330 is greater than the first threshold, the preset power 340 does not pass through the subtractor 316, and is directly received by the multiplexer 302 (not shown in FIG. 3). In other words, the processing unit 300 can indirectly and correspondingly adjust the power of the laser beam 118 according to the preset power 340, and can also make the detected temperature 318 substantially equal to or close to the target temperature 330.

In some embodiments, the method in which the processing unit 300 indirectly adjusts the power of the laser beam 118 according to the power error 334 (referred to as a power mode) is faster than the method in which the processing unit 300 indirectly adjusts the power of the laser beam 118 according to the predicted error value 332 (referred to as a temperature feedback mode) to let the detected temperature 318 be close to or substantially equal to the target temperature 330. Therefore, the processing unit 300 of the feedback controller 108 of the present invention executes the power mode when the absolute value of the error value between the detected temperature 318 and the target temperature 330 is greater than the first threshold (for example, point A on the detected temperature curve 202 in FIG. 2). In contrast, the processing unit 300 of the feedback controller 108 of the present invention executes the temperature feedback mode when the absolute value of the error value between the detected temperature 318 and the target temperature 330 is less than or equal to the first threshold (for example, points B and C on the detected temperature curve 202 in FIG. 2).

Figure 4:
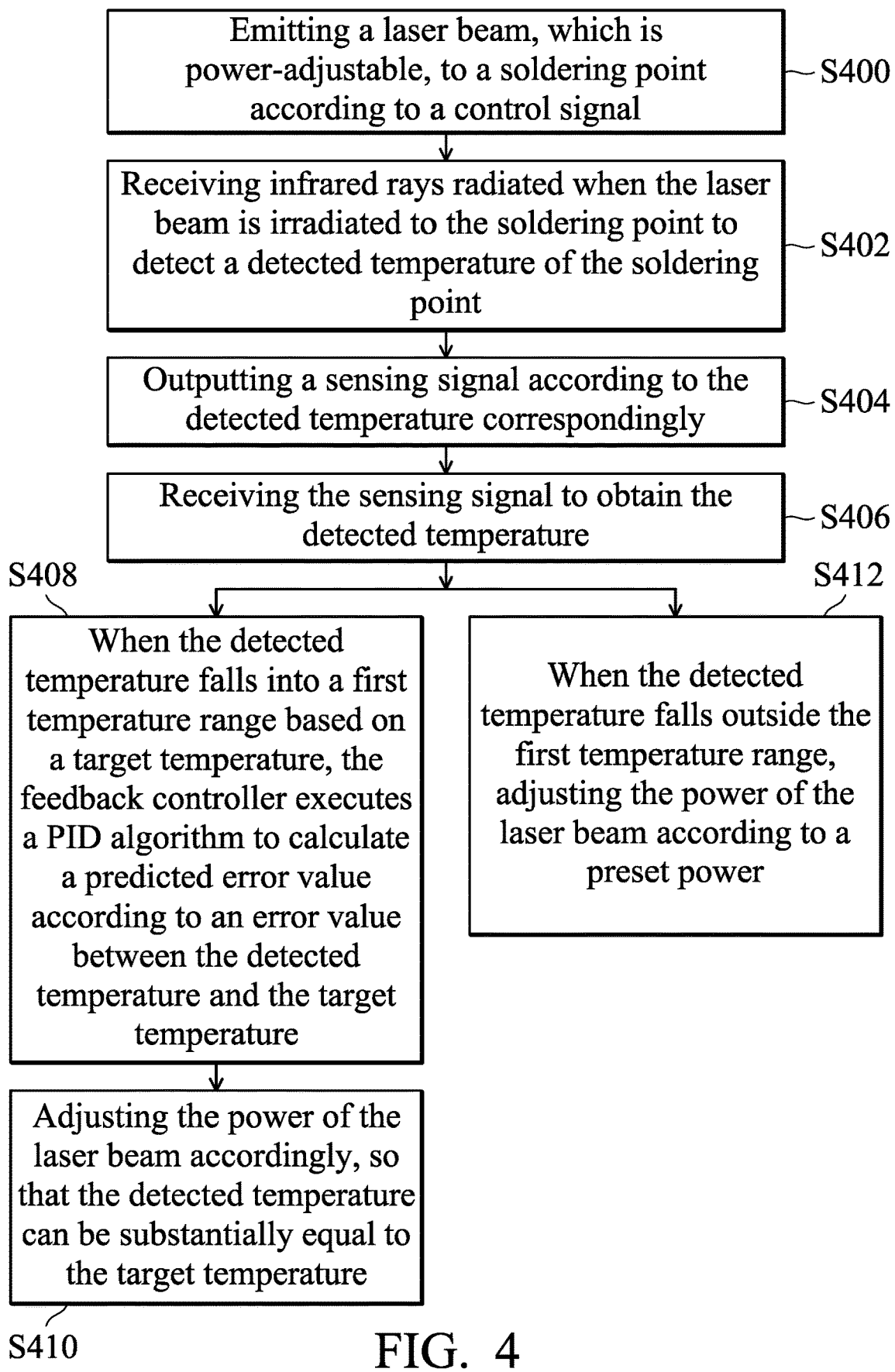
FIG. 4 is a flow chart of a laser soldering method in accordance with some embodiments of the disclosure.

The present invention also discloses a laser soldering method. FIG. 4 is a flow chart of a laser soldering method in accordance with some embodiments of the disclosure. As shown in FIG. 4, the laser soldering method of the present invention includes emitting a laser beam, which is power-adjustable, to a soldering point according to a control signal (step S400); receiving infrared rays radiated when the laser beam is irradiated to the soldering point to detect the temperature of the soldering point (step S402); outputting a sensing signal according to the detected temperature correspondingly (step S404); receiving the sensing signal to obtain the detected temperature (step S406); when the detected temperature falls into a first temperature range based on a target temperature, executing a PID algorithm to calculate a predicted error value according to an error value between the detected temperature and the target temperature (step S408); adjusting the power of the laser beam accordingly according to the predicted error value, so that the detected temperature can be substantially equal to the target temperature (step S410); and when the detected temperature falls outside the first temperature range, adjusting the power of the laser beam according to a preset power (step S412).

In some embodiments, the laser source 102 in FIG. 1 and FIG. 3 executes the step S400. The temperature sensor 106 in FIG. 1 and FIG. 3 executes the step S402 and the step S404. The feedback controller 108 in FIG. 1 and the processing unit 300 of the feedback controller 108 in FIG. 3 execute the step S406, the step S408, the step S410, and the step S412. The technical features of the laser soldering method of the present invention are the same as those of the laser soldering device 100 in FIG. 1, so it will not be repeated. The laser soldering device and he laser soldering method of the present invention adopt a temperature feedback mode to heat the soldering points in a generate state, and the temperature of the soldering point is monitored by a temperature sensor. When the temperature of the soldering point changes abnormally, that is, when the target temperature cannot be reached or the temperature rises sharply, the laser soldering device and the laser soldering method of the present invention can automatically switch to the power mode to heat the soldering point.

The ordinals in the specification and the claims of the present invention, such as "first", "second", "third", etc., have no sequential relationship, and are just for distinguishing between two different components with the same name. In the specification of the present invention, the word "couple" refers to any kind of direct or indirect electronic connection. The present invention is disclosed in the preferred embodiments as described above, however, the breadth and scope of the present invention should not be limited by any of the embodiments described above. Persons skilled in the art can make small changes and retouches without departing from the spirit and scope of the invention. The scope of the invention should be defined in accordance with the following claims and their equivalents.

What is claimed is:
1. A laser soldering device, comprising:
a laser source, emitting a laser beam, which is power-adjustable, according to a control signal;
a lens group, outputting the laser beam to a soldering point;
a temperature sensor, receiving infrared rays radiated when the laser beam is irradiated to the soldering point to detect a temperature of the soldering point; and correspondingly outputting a sensing signal according to the detected temperature; and
a feedback controller, receiving the sensing signal, and sending the control signal to the laser source according to the sensing signal;
wherein when the detected temperature falls into a first temperature range based on a target temperature, the feedback controller executes a PID algorithm to calculate a predicted error value according to an error value between the detected temperature and the target temperature; the feedback controller controls the laser source according to the predicted error value, and adjusts the power of the laser beam accordingly, so that the detected temperature can be substantially equal to the target temperature;
wherein when the detected temperature falls outside the first temperature range, the feedback controller controls the laser source according to a preset power, so that the laser source emits a laser beam that meets the preset power;

wherein the feedback controller executes the PID algorithm to generate a proportional calculation unit, an integral calculation unit, and a derivative calculation unit; the proportional calculation unit multiplies the error value between the currently detected temperature and the target temperature by a first gain to obtain a proportional result; the integral calculation unit sums the error value at each time point in the past to obtain a total error, and multiplies the total error by a second gain to obtain an integral result; and the derivative calculation unit performs a first-order differentiation on the current error value to obtain a future error value for predicting the future change of the error value, and multiplies the future error value by a third gain to obtain a derivative result.

2. The laser soldering device as claimed in claim 1, wherein the laser source comprises a power meter; the power meter detects the power of the laser beam, and correspondingly outputs a power feedback signal to the feedback controller according to the detected power, so that the feedback controller can adjust the power of the laser beam transmitted from the laser source through the control signal according to the power feedback signal.

3. The laser soldering device as claimed in claim 1, wherein the feedback controller sums the proportional result, the integral result, and the derivative result to obtain the predicted error value.

4. The laser soldering device as claimed in claim 1, wherein when the detected temperature falls into the first temperature range based on the target temperature, and also falls into a second temperature range based on the target temperature, the feedback controller sets the first gain, the second gain, and the third gain to a first value group; wherein the first temperature range comprises the second temperate range.

5. The laser soldering device as claimed in claim 3, wherein when the detected temperature falls into the first temperature range based on the target temperature, but the detected temperature does not fall into the second temperature range based on the target temperature, the feedback controller sets the first gain, the second gain, and the third gain to a second value group; wherein the second value group is not completely the same and not completely different from the first value group.

6. A laser soldering method, comprising steps of:
emitting a laser beam, which is power-adjustable, to a soldering point according to a control signal;
receiving infrared rays radiated when the laser beam is irradiated to the soldering point to detect a temperature of the soldering point;
outputting a sensing signal according to the detected temperature correspondingly;
receiving the sensing signal to obtain the detected temperature;
when the detected temperature falls into a first temperature range based on a target temperature, executing a PID algorithm to calculate a predicted error value according to an error value between the detected temperature and the target temperature; controlling the laser source according to the predicted error value; and adjusting the power of the laser beam accordingly, so that the detected temperature can be substantially equal to the target temperature; and
when the detected temperature falls outside the first temperature range, adjusting the power of the laser beam according to a preset power;
wherein executing the PID algorithm comprises steps of:
multiplying the error value between the currently detected temperature and the target temperature by a first gain to obtain a proportional result;
summing the error value at each time point in the past to obtain a total error, and multiplying the total error by a second gain to obtain an integral result; and
performing a first-order differentiation on the current error value to obtain a future error value for predicting the future change of the error value, and multiplying the figure error value by a third gain to obtain a derivative result.

7. The laser soldering method as claimed in claim 6, wherein executing the PID algorithm further comprises a step of:
summing the proportional result, the integral result, and the derivative result to obtain the predicted error value.

8. The laser soldering method as claimed in claim 6, further comprising a step of:
when the detected temperature falls into the first temperature range based on the target temperature, and also falls into a second temperature range based on the target temperature, setting the first gain, the second gain, and the third gain to a first value group; wherein the first temperature range comprises the second temperate range.

9. The laser soldering method as claimed in claim 7, further comprising a step of:
when the detected temperature falls into the first temperature range based on the target temperature, but the detected temperature does not fall into the second temperature based on the target temperature, setting the first gain, the second gain, and the third gain to a second value group; wherein the second value group is not completely the same and not completely different from the first value group.

* * * * *